United States Patent
Hirose (10) Patent No.: US 7,506,811 B2
(45) Date of Patent: Mar. 24, 2009

(54) DATA PROCESSING DEVICE, METHOD THEREOF, PROGRAM THEREOF, AND RECORDING MEDIUM RECORDING THE PROGRAM

(75) Inventor: Koji Hirose, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 553 days.

(21) Appl. No.: 11/157,202

(22) Filed: Jun. 21, 2005

(65) Prior Publication Data

US 2005/0283805 A1      Dec. 22, 2005

(30) Foreign Application Priority Data

Jun. 22, 2004   (JP)   ............... 2004-184044

(51) Int. Cl.
   *G06K 7/04*   (2006.01)
(52) U.S. Cl. ............... 235/444; 725/53; 725/58
(58) Field of Classification Search ........ 235/440; 725/53, 58
   See application file for complete search history.

(56) References Cited

U.S. PATENT DOCUMENTS 5,924,068 A * 7/1999 Richard et al. ............ 704/260

2003/0200545 A1  10/2003  Nakada ............... 725/53

FOREIGN PATENT DOCUMENTS

| CN | 1453998 A | 11/2003 |
| EP | 0 567 185 A2 | 10/1993 |
| JP | 2002-112142 | 4/2002 |
| WO | WO 2004/012101 A1 | 2/2004 |

OTHER PUBLICATIONS

European Search Report of Aug. 17, 2005.
Office Action dated Feb. 1, 2008 for Relevant Chinese Patent Application No. 200510077682.7.

* cited by examiner

*Primary Examiner*—Ahshik Kim
(74) *Attorney, Agent, or Firm*—Kratz, Quintos & Hanson, LLP (57) ABSTRACT

A processing section (250) of a recording/reproducing device (200) acquires content data of a content set by a user, and acquires program-linked data which links with content-main-data, from the content data. The processing section (250) acquires set keyword data stored in a memory (240), and determines whether or not the program-linked data includes a BML file having a character string related to a keyword set by the user. If it is determined that a BML file having the related character string is included, the processing section (250) specifies and acquires content-main-data with which the BML file links, from the content-main-data acquired.

13 Claims, 5 Drawing Sheets

DATA PROCESSING DEVICE, METHOD THEREOF, PROGRAM THEREOF, AND RECORDING MEDIUM RECORDING THE PROGRAM

BACKGROUND OF THE INVENTION

1. Field of the Invention

The present invention relates to a data processing device, method thereof, program thereof, and recording medium which records the program.

2. Description of Related Art

Conventionally, there has been a recording/reproducing device which can acquire EPG (Electric Program Guide) data distributed on broadcasting waves and can set recording reservations, based on the EPG data (see, for example, Japanese Patent Laid-Open Publication No. 2002-112142, left column of page 4 to left column of page 13).

In the device disclosed in the above-mentioned publication, EPG text data is created on the basis of SI (Service Information) distributed in the form of a TS (Transport Stream). Based on the EPG text data, a program table is displayed. Further, in program cells partitioned by frames of the program table, titles and summaries of programs to be broadcasted in predetermined time ranges are displayed. Afterwards, a user moves a cursor, which is displayed movably over the program table, to a program cell corresponding to a desired program. Then, a recording reservation is set by pressing an enter key.

However, the recording/reproducing device disclosed in the above publication can set only recording reservations in units of programs. Therefore, there can be a problem that, for example, when a user wants to watch only scenes in which a particular singer appears, operations for seeking those desired scenes from recorded programs may be complicated.

SUMMARY OF THE INVENTION

A major object of the present invention is to provide a data processing device capable of properly acquiring data, a method thereof, a program thereof, and a recording medium which records the program.

A data processing device according to an aspect of the present invention is characterized by comprising: a character data acquiring section which acquires character data; a content character data acquiring section which acquires content character data outputted together with data and indicating contents of the data; a partial data output date/time acquiring section which acquires partial data output date/time information which is related to the content character data relevant to the character data and concerns date/time when part of the data is outputted; and a data acquiring section which acquires part of the data which corresponds to the date/time when the part of the data is outputted, based on the partial data output date/time information corresponding to the character data in the content character data.

A data processing method according to another aspect of the present invention is a method for acquiring part of data by a calculating section, in which the calculating section executes the steps of: acquiring character data, acquiring content character data indicative of contents of the data outputted together with data, acquiring partial data output date/time information which is related to the content character data relevant to the character data, and which concerns date/time when part of the data is outputted, and acquiring part of the data corresponding to the date/time when the part of the data is outputted, based on the partial data output date/time information corresponding to the character data in the content character data.

A data processing program according to further another aspect of the present invention makes a calculating section function as the data processing device described above.

A data processing program according to still another aspect of the present invention makes a calculating section execute the data processing method described above.

A recording medium according to still another aspect of the present invention records the data processing program of the present invention described above, in a manner readable by a calculating section.

DETAILED DESCRIPTION OF PREFERRED EMBODIMENTS

Figure 1:
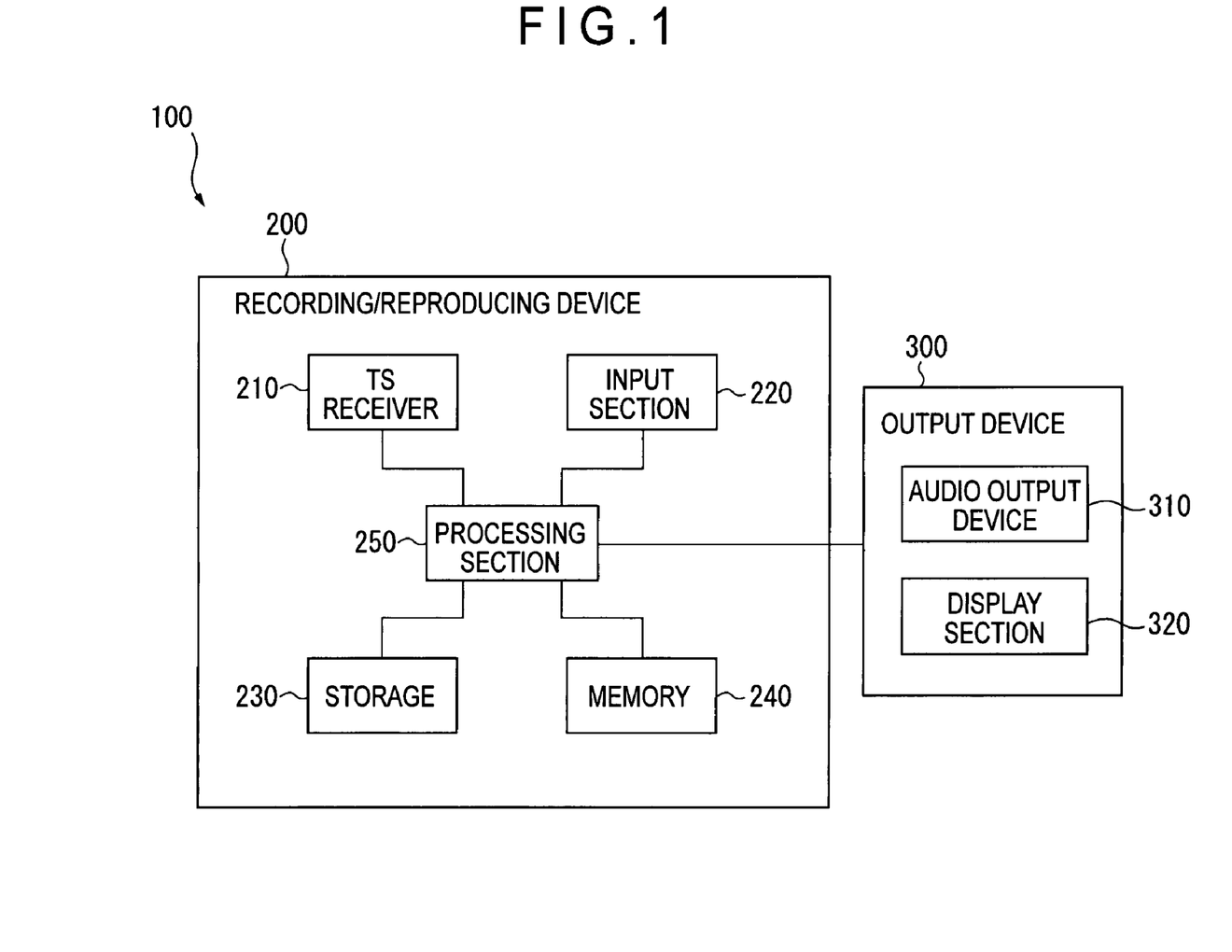
FIG. 1 is a block diagram showing a schematic structure of a content recording/reproducing system according to an embodiment of the present invention.
Figure 2:
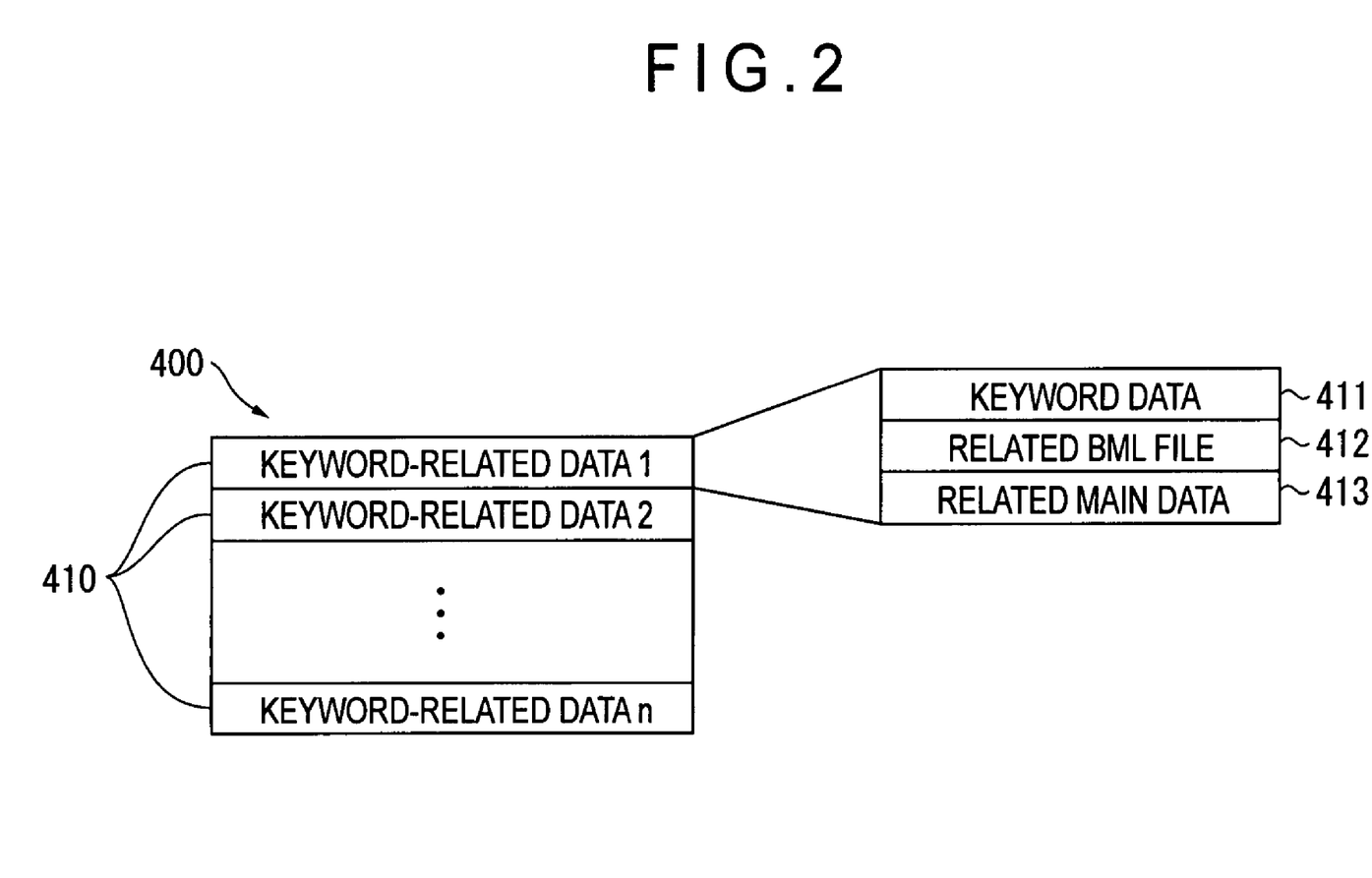
FIG. 2 is a schematic view showing a schematic structure of related-data list information in the embodiment.
Figure 3:
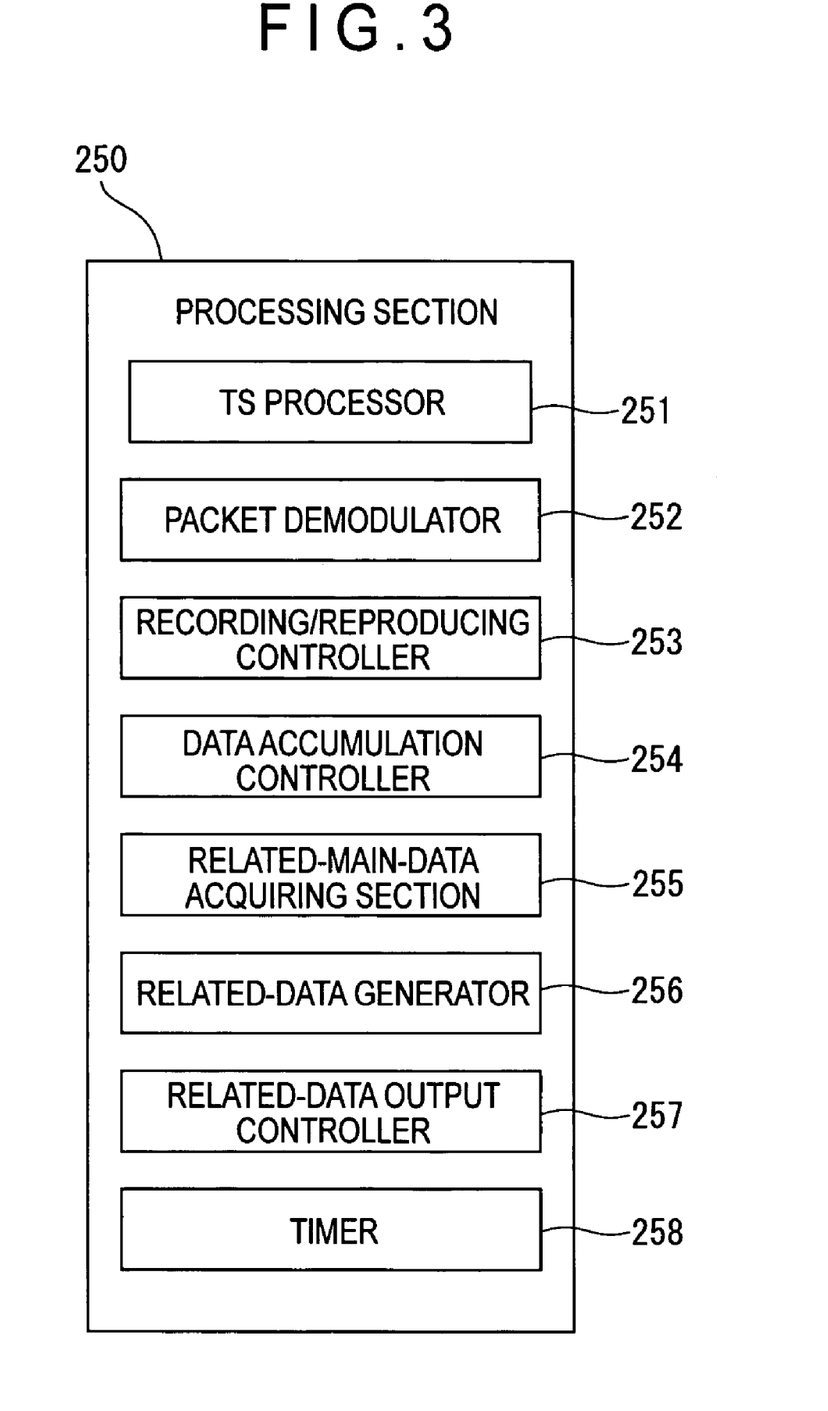
FIG. 3 is a schematic view showing a schematic structure of a processing section constituting the recording/reproducing device in the embodiment.

An embodiment of the present invention will now be described below on the basis of the drawings. Although the present embodiment will be described below with reference to an example of a recording/reproducing device having a data processing device according to the present invention, the present invention is not limited to this embodiment but may be applied to any structure capable of acquiring data. In addition, the following description will be made, exemplifying a structure in which audio data and video data corresponding to a particular scene in a content such as a TV program, and program-linked data linked to the particular scene are outputted synchronously. The present invention is not limited to this structure but can be applied to another structure in which, for example, both of the data are not outputted synchronously. FIG. 1 is a block diagram showing a schematic structure of a content recording/reproducing system according to the present embodiment. FIG. 2 is a schematic view showing a schematic structure of related-data list information. FIG. 3 is a schematic view showing a schematic structure of a processing section constituting the recording/reproducing device.

[Structure of Content Recording/Reproducing System]

In FIG. 1, the reference numeral 100 denotes a content recording/reproducing system (hereinafter referred to as a recording/reproducing system). This system, for example, records content data of contents such as TV programs or, in brief, records contents, and reproduces recorded contents. Further, the recording/reproducing system 100 has a recording/reproducing device 200, and an output device 300 which also functions as an alarm.

The output device 300 is, for example, a personal computer, television set, cellular phone, PDA (Personal Digital Assistant), or the like. The output device 300 receives contents inputted from the recording/reproducing device 200 and outputs the contents. Further, this output device 300 has an audio output section 310, a display section 320, etc.

The output section 310 has an audio output mechanism such as a loudspeaker (not shown) or the like. This output section 310 performs processing to output audio data as sounds via the audio output mechanism. The audio data are transmitted from the recording/reproducing device 200 as an analog signal or digital signal. Note that the audio output mechanism is capable of appropriately outputting TV audio data received by, for example, a not shown TV receiver.

The display section 320 displays video data, data-broadcasting data, EPG data, synthesized data, and the like which are transmitted from the recording/reproducing device 200 as an analog signal or digital signal. In this case, the video data to be displayed is, for example, a video of content. The data-broadcasting data to be displayed are, for example, later described program-linked data and program-non-linked data. Further, the EPG data to be displayed are, for example, program names of contents broadcasted on individual channels, summaries thereof, program tables describing broadcast date/time, and the like. Further, the synthesized data is, for example, a synthesized video in which captions are overlapped on a video of a content, a video which shows data broadcasting and a program table arranged in parallel, or the like. The display section 320 is, for example, a liquid crystal display panel, organic EL (Electro Luminescence) panel, PDP (Plasma Display Panel), CRT (Cathode-Ray Tube), FED (Field Emission Display), electrophoretic display panel, or the like. The display section 320 can appropriately output TV video data received by the TV receiver, for example.

The recording/reproducing device 200 performs processing for acquiring and recording content data which is distributed in the form of a TS (Transport Stream) and includes audio data, video data, and data-broadcasting data, and for making the data be outputted through the output device 300. Here, audio data and video data function as data of the present invention. In the following description, when audio data and video data included in content data are gathered together for expression, these data are referred to as content-main-data. Also, the recording/reproducing device 200 performs processing for properly reproducing recorded content data and making the output device 300 output the data. Further, this recording/reproducing device 200 includes a TS receiver 210, input section 220, storage 230, memory 240, processing section 250 as a calculating section.

The TS receiver 210 is connected to a TS antenna (not shown), which receives broadcasting waves of terrestrial digital broadcasting, satellite digital broadcasting, and the like. This TS receiver 210 acquires a TS corresponding to a content selected among plural TSs by a user, under control of the processing section 250. Further, the TS receiver 210 outputs the acquired TS as a TS signal to the processing section 250.

In this case, data broadcasting data distributed as the TS is either program-linked data or program-non-linked data. The program-linked data is data for making the output device 300 output various information linked to a particular scene in content. The program-linked data includes, for example, a performer in a particular scene, a store or building presented in a particular scene, or data for outputting information about a particular project in content. Further, the program-linked data includes a BML (Broadcast Markup Language) file or the like. This BML file includes text data, linked additional data, and the like. There may be a case that the BML file is configured with no linked additional data included. The linked additional data is data for outputting other information linked to a particular scene other than characters, e.g., images and audio. The text data includes content character data, synchronization information as partial data output date/time information, and the like. The content character data is data for outputting characters indicative of the contents of the particular scene. The synchronization information is information to synchronize outputs of the content character data and/or linked additional data with content-main-data corresponding to the particular scene in the content. More specifically, the synchronization information includes linked-data output start information concerning date/time when outputting of each of data included in the BML file is started, and linked-data output time information concerning a time period for which the linked data output time information is being outputted. In the present embodiment, as described above, the content-main-data of the particular scene and the program-linked data linked with the particular scene are outputted synchronously. Therefore, the linked data output start information constitutes the partial data output start date/time information according to the present invention, and the linked-data output time information constitutes the partial data output end date/time information according to the present invention. The program-non-linked data is data to make the output device 300 output various information not linked with the content outputted by the content-main-data. The program-non-linked data includes data for outputting weather forecast and news, for example. This program-non-linked data includes a BML file similar to the program-linked data. The BML file included in the program-non-linked data does not include synchronization information.

The input section 220 includes various operation buttons and operation dials (not shown), which are exposed from the front surface of a casing (not shown) and are arranged to allow input operations. The contents of input operations of those operation buttons and operation dials are items of setting concerning the contents of operations of, for example, the recording/reproducing device 200. More specifically, examples of the setting are setting of a TS received by the TS receiver 210, setting of recording and reproducing contents, and setting of a related data generation mode in which keyword-related data 410 described later is generated. Further, the input section 220 outputs various information as operation signals to the processing section 250, to set the operation signals. Note that the input section 220 is not limited to input operations by means of operation buttons and operation dials but may adopt any structure as far as the structure is capable of setting/inputting various setting items, e.g., input operations by means of a touch panel provided in the display section 320 of the output device 300, input operation based on audio, and the like. Also, the input section 220 may have a structure in which various information transmitted from a remote controller not shown via infrared rays is received, and the various information is outputted as operation signals to the processing section 250, to perform setting.

The storage 230 has a related-data storage area as linked-data storage not shown, processing data storage area as a data accumulator, and content storage area. In this case, the storage 230 having the three areas as described above has been exemplified. However, the present invention is not limited to this but may have a different structure which does not include the areas described above or includes further another area. Further, the storage 230 may be, for example, a magnetic disk such as a HD (Hard Disk), an optical disk such as a DVD (Digital Versatile Disc), a drive or driver such as a memory card capable of readably storing data on various recording media.

The related-data storage area stores related-data list information 400 as shown in FIG. 2, with the information being appropriately readable. The related-data list information 400 is configured by relating at least one piece of keyword-related data 410 as one data structure. The keyword-related data 410 may be of various data related to keywords set by a user. The keyword-related data 410 is appropriately generated by the processing section 250. Further, the keyword-related data 410 is configured by relating keyword data 411, a related BML file 412, and related main data 413 with each other. The keyword data 411 is data indicative of a keyword and output start date/time of related main data 413. In place of the output start date/time of the related main data 413, any structure may be adopted as far as if the keyword data 411 is identical to the different keyword-related data 410, e.g., a structure using the order in which the keyword-related data 410 is generated or a program name of the related main data 413. The related BML file 412 is a BML file which incorporates text data including a character sequence identical to or related to the keyword of the keyword data 411. If the keyword is a name of a singer, for example, this related BML file 412 is a BML file to make the output device 300 outputs information related to the singer. The related main data 413 is content-main-data corresponding to a particular scene of a content linked to the related BML file 412. If the related BML file 412 is a BML file related to a singer, the related main data 413 is a content-main-data to make the output device 300 output a scene in which the singer appears.

The processing data storage area is used for a processing of generating keyword-related data 410. In the area, a demodulated content-main-data, and program-linked data lined with the content-main-data are stored readably appropriately. The content storage area appropriately readably stores partial TSs of contents and various demodulation data, i.e., content data.

The memory 240 appropriately readably stores various data which are required when reserving/recording desired content data or reproducing reserved/recorded content data. Also, the memory 240 appropriately readably stores setting keyword data as character data at least concerning a keyword set by a user. Further, the memory 240 appropriately readably stores various programs and the like to be developed over an OS (Operating System) which controls operations of the whole recording/reproducing device 200. For the memory 240, it is desirable to use a memory having a structure in which the memory is held even when the power suddenly shuts down because of blackout or the like, e.g., a CMOS (Complementary Metal-Oxide Semiconductor) memory. Alternatively, the memory 240 may have a structure including a drive or driver which readably stores data onto a recording medium such as a HD, DVD, optical disk, or the like.

The processing section 250 has various input/output ports not shown, e.g., a TS receiver port connected with the TS receiver 210, an input port connected with the input section 220, a storage port connected with the storage 230, a memory port connected with the memory 240, and the like. Further, the processing section 250 has, as various programs, a TS processor 251, a packet demodulator 252, a recording/reproducing controller 253, a data accumulation controller 254 which also serves as a content character data acquiring mechanism and a data output date/time acquiring mechanism, a related-main-data acquiring section 255 as a data acquiring mechanism which also serves as a character data acquiring mechanism and a partial data output date/time acquiring mechanism, a related-data generator 256 as a data-linking mechanism, a related-data output controller 257 as a notification control mechanism, a timer 258, and the like, as shown in FIG. 3. Note that the data accumulation controller 254, related-main-data acquiring section 255, related-data generator 256, and related-data output controller 257 constitute a data processing device of the present invention. The data processing device may have a structure which does not include the related-data generator 256 or the related-data output controller 257.

The TS processor 251 separates TS packets which incorporate content data selected by a user from TSs acquired by the TS receiver 210, and appropriately outputs the TS packets to the recording/reproducing controller 253. More specifically, the TS processor 251 acquires a TS outputted as TS signals from the TS receiver 210. The TS processor 251 further separates, from the TS, TS packets (hereinafter called audio packets) which incorporate audio data corresponding to the content selected by the user, TS packets (hereinafter called video packets) which incorporate video data, and TS packets (hereinafter called data packets) which incorporate data-broadcasting data or EPG data. The TS processor 251 properly outputs the separated packets to the packet demodulator 252. Also, the TS processor 251 reconstructs the respective packets into a TS having a structure of a series of data strings, i.e., and properly outputs the packets to the recording/reproducing controller 253. Further, the TS processor 251 acquires the partial TS from the recording/reproducing controller 253, and separates the partial TS into respective packets. The TS processor 251 then outputs properly the separated respective packets to the packet demodulator 252.

The packet demodulator 252 properly demodulates the respective packets from the TS processor 251 to content data. More specifically, when the packet demodulator 252 acquires an audio packet from the TS processor 251, the packet demodulator 252 demodulates audio data incorporated in the audio packet. The packet demodulator 252 then properly outputs the audio data to the audio output section 310 of the output device 300 and the data accumulation controller 254. When a video packet or data packet is acquired from the TS processor 251, the packet demodulator 252 demodulates video data, data-broadcasting data, or EPG data incorporated in each packet. Further, each of those pieces of demodulated data is properly outputted to the display section 320 of the output device 300 or the data accumulation controller 254.

The recording/reproducing controller 253 performs a processing of acquiring content data of the content desired by a user and of storing the content data into a content storage area in the storage 230. More specifically, the recording/reproducing controller 253 properly controls operations of the TS processor 251 by operation signals based on input operations from the input section 220, to reconstruct a TS currently acquired by the TS processor 251 into a partial TS. Based on information concerning a recording reservation stored in the memory 240, the recording/reproducing controller 253 properly controls operations of the TS receiver 210 and the TS processor 251, so as to reconstruct a partial TS corresponding to the content whose recording start date/time is the current time calculated by the timer 258. Further, the recording/reproducing controller 253 acquires the partial TS reconstructed by the TS processor 251 and makes the partial TS stored into the content storage area in the storage 230.

Further, the recording/reproducing controller 253 performs a processing of outputting content data stored in the content storage area of the storage 230, to the output device 300, to make the output device 300 reproduce the content data. More specifically, the recording/reproducing controller 253 reads a partial TS of a content specified by an operation signal based on an input operation at the input section 220, such as a content specified by an input operation of selecting any of thumbnails listed and displayed by the output device 300, or a content requested previously to be reproduced by a timer or the like, at a predetermined time. Further, the recording/reproducing controller 253 outputs the partial TS to the TS processor 251. Further, content data is demodulated from the partial TS, by properly controlling operations of the TS processor 251 and the packet demodulator 252, to output the content data to the output device 300.

The data accumulation controller 254 properly controls operations of the TS receiver 210 and the packet demodulator 252, to perform a processing of appropriately readably storing the content-main-data and the program-linked data into the processing data storage area in the storage 230. More specifically, when the data accumulation controller 254 recognizes that a related-data generation mode is set by an operation signal based on an input operation at the input section 220, the data accumulation controller 254 acquires channel information concerning a channel preset by the user. Further, the data accumulation controller 254 properly controls operations of the TS receiver 210 and the TS processor 251, to acquire packets corresponding to contents broadcasted on the channel according to the channel information. Also, the data accumulation controller 254 properly controls operations of the packet demodulator 252, to demodulate each of content-main-data and program-linked data from the packets acquired by the TS processor 251. Then, these demodulated content-main-data and program-linked data are stored into the processing data storage area. Further, current date/time information is acquired from the timer 258 when storing of the content-main-data is started. This current date/time information is stored, as storing-start date/time information as data output date/time information, into the processing data storage area. Also, the data accumulation controller 254 properly deletes all data that has been made stored in the processing data storage area.

The related-main-data acquiring section 255 acquires content-main-data linked with a keyword set by a user, based on each piece of data stored in the processing data storage area and the memory 240. More specifically, the related-main-data acquiring section 255 acquires set keyword data from the memory 240 and recognizes the keyword set by the user. Also, the related-main-data acquiring section 255 acquires program-linked data stored in the processing data storage area of the storage 230, and determines whether a BML file of the acquired program-linked data incorporates content character data including a character string related to the keyword (hereinafter referred to as a related character string). That is, the related-main-data acquiring section 255 determines whether a BML file having a related character string is included in the acquired program-linked data. If it is determined that there exists a BML file having a related character string, synchronization information of the BML file is acquired. Based on linked-data output start information and linked-data output time information of the synchronization information, the related-main-data acquiring section 255 recognizes output start date/time and output end date/time of each of data in the BML file. That is, the related-main-data acquiring section 255 recognizes the output start date/time and output end date/time of the content-main-data with which the BML file links. Also, the related-main-data acquiring section 255 acquires storing start date/time information from the processing data storage area, and recognizes storing start date/time of the content-main-data stored in the processing data storage area, i.e., output start date/time of the content-main-data. Then, based on the date/time thus recognized, the related-main-data acquiring section 255 recognizes an interval from when outputting of the content-main-data is started to when the content-main-data with which the BML file links is outputted. Further, based on the recognized interval, the related-main-data acquiring section 255 specifies the position of the content-main-data with which the BML file links, in the content-main-data stored in the processing data storage area, and acquires the content-main-data at the specified position.

The related-data generator 256 properly generates keyword-related data 410 and incorporates the data into the related-data list information 400. Specifically, the related-data generator 256 acquires a BML file which links with content-main-data acquired by the related-main-data acquiring section 255. Also, the related-data generator 256 acquires set-keyword data of a keyword related to a related character string which the acquired BML files has. Then, the related-data generator 256 generates keyword related data 410 incorporating: data indicative of the keyword of the acquired set-keyword data and output start date/time of the content-main-data as keyword data 411; the BML file having a related character string as a related BML file 412; and the content-main-data acquired by the related-main-data acquiring section 255 as related main data 413. Further, the related-data generator 256 incorporates the generated keyword-related data 410 into the related-data list information 400.

The related-data output controller 257 makes the output device 300 output the related BML file 412 of the keyword-related data 410 and the related main data 413. More specifically, the related-data output controller 257 acquires keyword data 411 of the keyword-related data 410 by means of an operation signal based on an input operation through the input section 220, and makes the output device 300 list and display the data. The structure to list and display the keyword data 411 may be, for example, a structure which lists and displays the keyword data 411 of all the keyword-related data 410 incorporated in the related-data list information 400 or a structure which selectively lists and displays only those keyword data 411 that relate to a particular genre. However, the structure is not limited hitherto. Further, the related-data output controller 257 acquires keyword select information as character data select information expressing that particular keyword data 411 has been selected, by an operation signal based on an input operation on the input section 220. Then, the related-data output controller 257 recognizes the keyword-related data 410 which incorporates the keyword data 411 selected by the keyword select information. Further, the related-data output controller 257 acquires a related BML file 412 and related main data 413 of the keyword related data 410, and outputs the file and data to the output device 300. This example suggests a structure in which the related BML file 412 and related main data 413 are outputted by processing as described above by the related-data output controller 257. However, the structure is not limited hitherto but may be a structure in which the file and data are outputted appropriately by another processing.

The timer 258 calculates the current date/time, based on a reference pulse such as an internal clock or the like. Then, the timer 258 properly outputs the current date/time information concerning the current date/time.

[Operation of Content Recording/Reproducing System]

Figure 4:
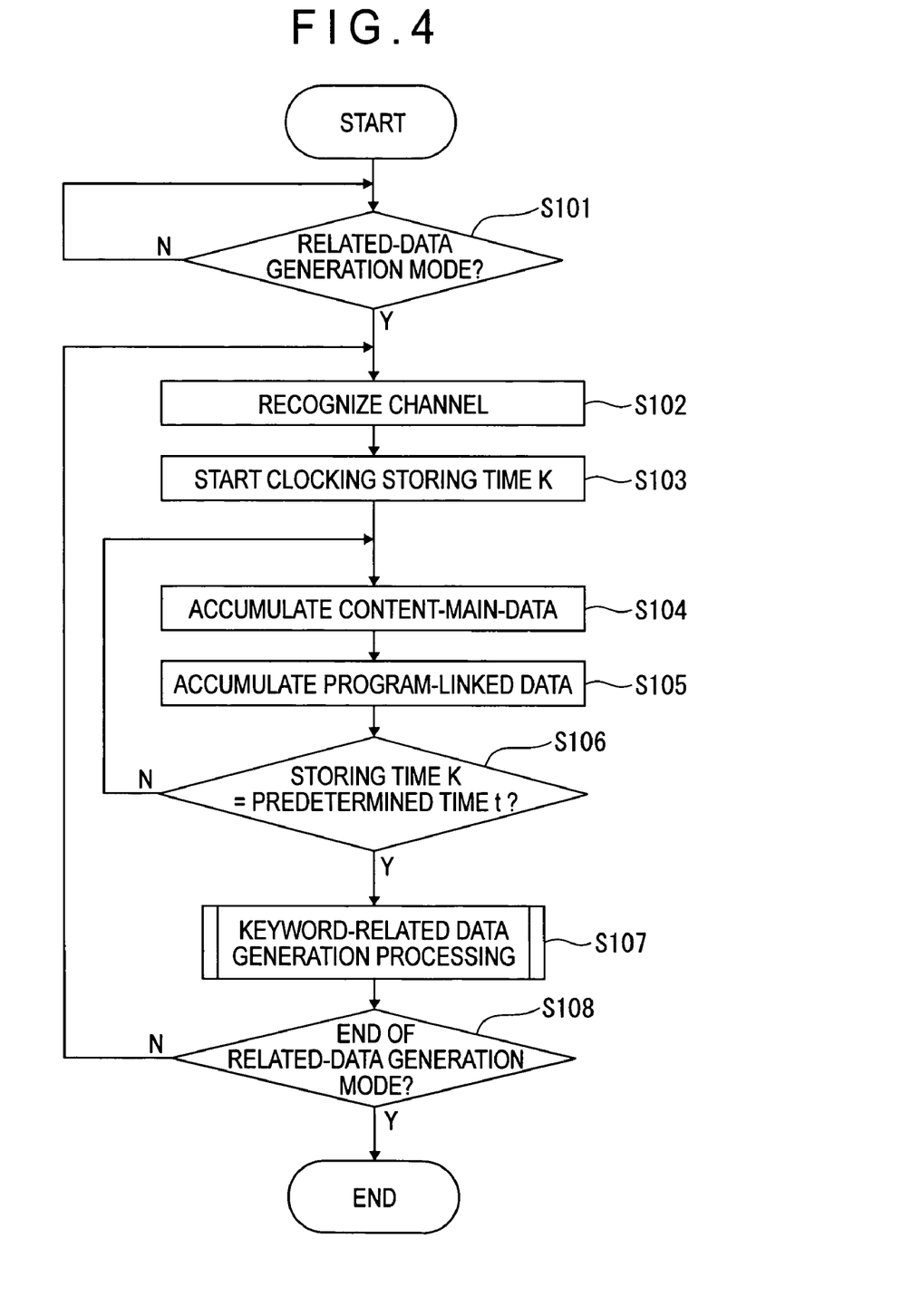
FIG. 4 is a flowchart showing a processing in a related-data generation mode in the embodiment.
Figure 5:
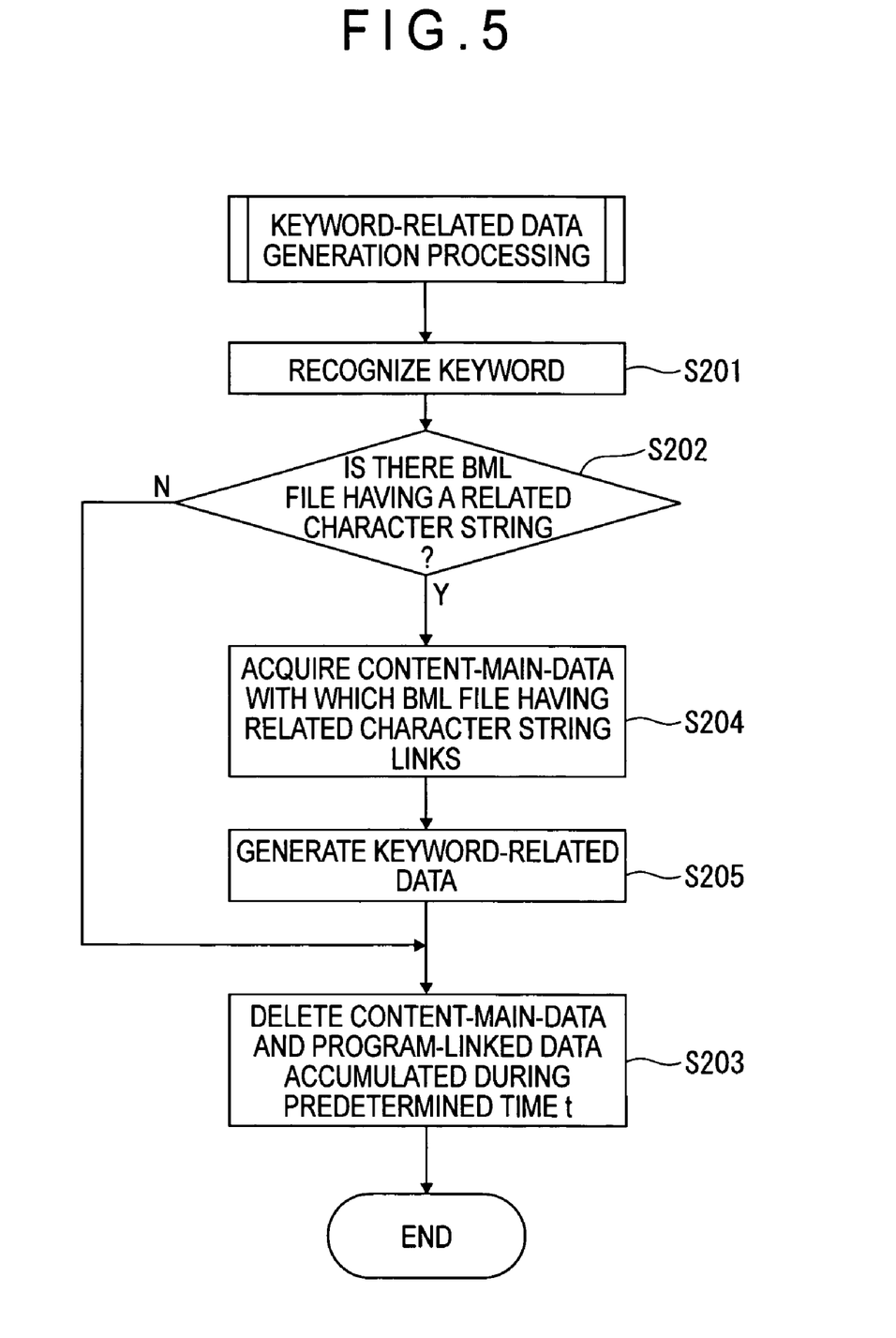
FIG. 5 is a flowchart showing a processing of generating keyword-related data in the embodiment.

Next, as operations of the recording/reproducing system 100, processings in the related-data generation mode will be described on the basis of FIGS. 4 and 5. FIG. 4 is a flowchart showing a processing in the related-data generation mode. FIG. 5 is a flowchart showing a processing of generating keyword-related data.

At first, a user carries out inputting for setting the related-data generation mode, by an input operation on the input section 220. The recording/reproducing device 200, as shown in FIG. 4, recognizes the input of setting which indicates that the related-data generation mode has been set, by means of the data accumulation controller 254 of the processing section 250 (step S102). Then, the recording/reproducing device 200 acquires channel information and recognizes the channel which is set to be received, by the user (step S101). Further, the data accumulation controller 254 acquires current date/time information from the timer 258, and recognizes the current date/time of the current date/time information, as calculation start date/time of the storing time K. Further, clocking of the storing time K is started (step S103). Thereafter, the data accumulation controller 254 controls operations of the TS receiver 210, TS processor 251, packet demodulator 252, and the like, to acquire content data of a content broadcasted on the set channel. Then, the data accumulation controller 254 acquires content-main-data from the content data, and makes the content-main-data stored and accumulated in the processing data storage area in the storage 230 (step S104). Also, when storing of the content-main-data is started, the data accumulation controller 254 acquires current date/time information as storing-start date/time information, from the timer 258, and makes the information stored in the processing data storage area. Further, the data accumulation controller 254 acquires, from the acquired content data, program-linked data which links with the content-main-data accumulated in the processing data storage area, and makes the program-linked data stored and accumulated in the processing data storage area in the storage 230 (step S105).

Further, the data accumulation controller 254 acquires the current date/time information from the timer 258 to recognize the current date/time, and determines whether or not the storing time K reaches predetermined time t which has been set in advance (step S106). If it is determined in the step S106 that the predetermined time t has not been reached, the processing returns to the step S104. Otherwise, if it is determined by the data accumulation controller 254 in the step S106 that the storing time K has reached the predetermined time t, the processing section 250 performs a processing of generating keyword-related data 410, by means of the related-main-data acquiring section 255 and the related-data generator 256 (step S107). After, the processing section 250 performs the processing of generating the keyword-related data 410 in the step S107, it determines whether or not an input of setting termination of the related-data generation mode has been recognized (step S108). If it is determined in this step S108 that an input of setting termination of the related-data generation mode has been recognized, the processing is terminated. Otherwise, if it is determined in the step S108 that the data accumulation controller 254 has not recognized the input of setting termination of the related-data generation mode, the processing returns to the step S102.

In the processing of generating the keyword-related data 410, as shown in FIG. 5, the processing section 250 acquires set keyword data by means of the related-main-data acquiring section 255, to recognize the keyword preset by a user (step S201). Further, the processing section 250 acquires program-linked data stored in the processing data storage area. Thereafter, the related-main-data acquiring section 255 determines whether or not the acquired program-linked data includes a BML file having a related character string (step S202). If it is determined in the step S202 by the related-main-data acquiring section 255 that there is no BML file including a related character string, in the data accumulation controller 254, the processing section 250 deletes content-main-data and program-linked data accumulated in the processing data storage area in the storage 230 during the predetermined time t (step S203), and terminates the processing of generating the keyword-related data 410. Otherwise, if it is determined in the step S202 that there is a BML file having a related character string, the related-main-data acquiring section 255 acquires content-main-data with which the BML file links, based on the synchronization information of the program-linked data including the BML file and the storing-start date/time information of the processing data storage area (step S204). Thereafter, the related-data generator 256 generates keyword-related data 410 which incorporates: the keyword related to the related character string and data indicative of output start date/time of the content-main-data acquired by the related-main-data acquiring section 255, as keyword data 411; the BML file including the related character string, as a related BML file 412; and the content-main-data acquired by the related-main-data acquiring section 255, as related main data 413 (step S205). Further, the keyword-related data 410 is incorporated into the related data list information 400, and the processing in the step S203 is executed.

[Operation and Advantages of Content Recording/Reproducing System]

As has been described above, in the above embodiment, the processing section 250 of the recording/reproducing device 200 controls operations of the TS receiver 210, TS processor 251, packet demodulator 252, and the like by the data accumulation controller 254, to acquire content data of a content set by a user. Further, the processing section 250 acquires program-linked data which links with content-main-data, from the content data. The processing section 250 also acquires set-keyword data stored in the memory 240 by the related-main-data acquiring section 255, to recognize a keyword set by the user. Thereafter, the related-main-data acquiring section 255 recognizes that the program-linked data acquired by the data accumulation controller 254 includes a BML file having a related character string, and then acquires synchronization information from the BML file. Further, based on this synchronization information, the related-main-data acquiring section 255 recognizes the date/time when content-main-data with which the BML file links is outputted, and acquires content-main-data outputted at the recognized date/time.

Therefore, the processing section 250 of the recording/reproducing device 200 can acquire, by the related-main-data acquiring section 255, only the content-main-data of a particular scene related to the keyword set by the user, from the content-main-data of a content being broadcasted, based on program-linked data outputted in synchronization with the content-main-data corresponding to the particular scene of the content. Specifically, for example, based on program-linked data which is outputted in synchronization with a scene in which a particular singer appears in a popular music program, to make a profile of the particular singer outputted, the recording/reproducing device 200 can acquire only the content-main-data of a scene in which the particular singer appears. Also, the user need not seek a desired scene from a recorded content or edit a desired scene. Accordingly, the recording/reproducing device 200 can properly acquire content-main-data.

The synchronization information includes linked-data output start information concerning date/time when outputting of content-main-data synchronized with each data included in a BML file is started, and linked-data output time information concerning time when the content-main-data is being outputted. Further, the related-main-data acquiring section 255 acquires content-main-data of a particular scene concerning a keyword, based on linked-data output start information and linked-data output time information. Therefore, the related-main-data acquiring section 255 executes an acquiring processing, based on information concerning output start date/ time and output end date/time of the content-main-data of the particular scene. Other content-main-data than that of the particular scene is not acquired. Accordingly, the recording/reproducing device 200 can more properly acquire content-main-data.

Upon having acquired the content-main-data and program-linked data, the data accumulation controller 254 makes each of these data stored in the processing data storage area of the storage 230. Also, storing-start date/time information concerning the date/time when storing of content-main-data is started is made stored in the processing data storage area. Further, based on synchronization information and storing-start date/time information in a BML file having a related character string, the related-main-data acquiring section 255 specifies and acquires the position of the content-main-data of the particular scene in the content-main-data stored in the processing data storage area. Therefore, the processing speed of the related-main-data acquiring section 255 can be lower compared with a structure in which content-main-data and program-linked data are not stored in the processing data storage area, e.g., a structure in which whether the BML file of the program-linked data includes a related character string or not is determined. Accordingly, it is unnecessary to raise the processing speed of the related-main-data acquiring section 255. Compared with a structure in which program-linked data is not stored in the processing data storage area, costs for the recording/reproducing device 200 can be reduced.

Based on synchronization information and storing-start date/time information of the BML file having the related character string, the related-main-data acquiring section 255 recognizes the interval from the date/time when outputting of content-main-data stored in the processing data storage area was started to when outputting of content-main-data with which the BML file links is started. Based on this interval, the position of the content-main-data with which the BML file links is specified, and the content-main-data at the specified position is acquired. Therefore, the data accumulation controller 254 can make the related-main-data acquiring section 255 acquire the content-main-data by merely making the storing start date/time information stored when storing of the content-main-data is started. Accordingly, processing load to the data accumulation controller 254 can be reduced.

The processing section 250 makes the content-main-data and program-linked data accumulated in the processing data storage area for a predetermined time t by the data accumulation controller 254. Then, the processing section 250 determines, by the related-main-data acquiring section 255, whether or not there is a BML file having a related character string in the processing data storage area. If the data accumulation controller 254 recognizes, by the related-main-data acquiring section 255, that whether there is such a BML file or not has been determined, the data accumulation controller 254 deletes all data accumulated in the processing data storage area within the predetermined time t. Therefore, the storage capacity of the processing data storage area can be set substantially equal to the capacity to which content-main-data and program-linked data can be accumulated for the predetermined time t. Accordingly, the storage capacity of the processing data storage area can be reduced to the minimum, so that costs for the recording/reproducing device 200 can be reduced.

The related-data generator 256 generates keyword-related data 410 which incorporates: the content-main-data acquired by the related-main-data acquiring section 255, as related main data 413; a BML file which links with the related main data 413, as a related BML file 412; and data indicative of a related character string which the related BML file 412 has, as keyword data 411. Further, the related-data output controller 257 properly makes the output device 300 display the keyword data 411. If keyword select information indicating that particular keyword data 411 has been selected by a user is acquired, the related-data output controller 257 outputs, to the output device 300, a related BML file 412 and related main data 413 that correspond to the keyword data 411 selected on the basis of the keyword select information. Therefore, the user is capable of making the output device 300 output audio and video or data broadcasting of a particular scene related to the keyword of the keyword data 411, in a simple method of selecting the keyword data 411 displayed on the output device 300. Accordingly, the recording/reproducing device 200 can provide improved conveniences.

[Modification]

The present invention is not limited to the embodiment as described above but may include modifications described below within the range of the present invention in which the object of the present invention can be achieved.

An example has been described above with respect to a structure in which content-main-data with which a BML file links is acquired on the basis of each of data stored in the processing data storage area by the related-main-data acquiring section 255. The structure is not limited to this but may be arranged as follows. That is, the data accumulation controller 254 does not make program-linked data stored in the processing data storage area. Immediately before a BML file of program-linked data is outputted from the output device 300 by the related-main-data acquiring section 255, the BML file is acquired to determine whether or not the BML file includes a related character string. If the related character string is determined as being included, content-main-data outputted in synchronization with the BML file may be acquired as content-main-data with which the BML file links. In case of this structure, a processing of acquiring content-main-data is carried out in place of the processing of the step S104, after the processing of the step S102 is carried out. Further, in place of the processing of the step S105, a processing of acquiring program-linked data is carried out, and the processing of the step S107 is carried out. In this structure, the processing of the steps S103 and S106 can be omitted. Therefore, processing load to the processing section 250 can be reduced. In addition, it is unnecessary to include a processing data storage area in the storage 230. Accordingly, the capacity of the storage 230 can be reduced so that costs for the recording/reproducing device 200 can be reduced.

An example has been described above with respect to a structure in which content-main-data with which a BML file links is acquired on the basis of storing-start date/time information by the related-main-data acquiring section 255. The structure is not limited to this but may be arranged as follows. That is, when content-main-data is stored by the data accumulation controller 254, for example, storing date/time information concerning the date/time of the storing of the content-main-data is stored and linked therewith for every one second. Further, output start date/time and output end date/time of the content-main-data to acquire based on synchronization information are recognized by the related-main-data acquiring section 255. Thereafter, storing date/time information concerning each of the output start date/time and the output end date/time is searched for. The structure may be arranged so as to acquire content-main-data from content-main-data related to the storing date/time information concerning the output start date/time to content-main-data related to the storing date/time information concerning the output end date/time. In this structure, the position of content-main-data to acquire can be specified by merely searching for storing date/time information concerning each of the output start date/time and the output end date/time. Compared with the structure of the embodiment described above, the position of content-main-data can be specified more easily. Accordingly, processing load to the related-main-data acquiring section 255 can be reduced.

An example has also been described above with respect to a structure in which the data accumulation controller 254 is provided with a function to appropriately delete all the data accumulated in the processing data storage area within a predetermined time t. However, the structure need not be provided with a function of this kind. In such a structure, it is unnecessary to provide the data accumulation controller 254 with a function to clock the storing time K. Therefore, the structure of the data accumulation controller 254 can be simplified, so that costs for the recording/reproducing device 200 can be reduced.

Also, an example has been described above with respect to a structure in which keyword data 411, a related BML file 412, and related main data 413 are incorporated in keyword-related data 410. The structure is not limited to this but no related MBL file 412 may be incorporated. In this structure, the data volume of the keyword-related data 410 can be reduced. Therefore, a much larger volume of keyword-related data 410 can be stored in the related-data storage area.

An example has also been described with respect to a structure which responds to a case that content-main-data corresponding a particular scene of a content, and program-linked data corresponding to the particular scene are outputted in synchronization with each other. However, if these data are not outputted synchronously, the structure may be arranged as follows. That is, synchronization information of a BML file is arranged to include partial data output start date/time information concerning date/time when outputting of content-main-data of a particular scene is started, and partial data output end date/time information concerning date/time when outputting of the content-main-data ends, in addition to linked-data output start information and output data output time information. Further, the structure may be arranged such that the content-main-data of the particular scene is acquired from the processing data storage area, by the related-main-data acquiring section 255, based on the partial data output start date/time information and partial data output end date/time information. In this structure, for example, even if a profile is outputted from the middle of a scene in which a particular singer appears in a popular music program, content-main-data can be acquired from the first scene from which the singer has been appearing. Therefore, the recording/reproducing device 200 can have improved conveniences.

An example has been described above with respect to a structure in which the recording/reproducing device 200 is provided with the related-data generator 256 and the related-data output controller 257. The structure is not limited to this but may be arranged as follows. That is, the related-data generator 256 and related-data output controller 257 need not be provided in the recording/reproducing device 200 but may be provided in a related-data reproducing device not shown. In this structure, the structure of the recording/reproducing device 200 can be simplified. Therefore, costs for the recording/reproducing device 200 can be reduced.

An example has also been described above with respect to a structure in which the data processing device of the present invention is applied to the recording/reproducing device 200 which stores content data. However, the structure is not limited to this. For example, data can be radio broadcast programs, satellite broadcast programs, music data or video data distributed via a network, application software, game software, various control programs, or the like, in addition to TV broadcast programs. In addition, the structure is not limited to the application to the recording/reproducing device 200 but may be arranged for a recording device which only reads data and further for an independent data processing device which makes a recording device or the recording/reproducing device 200 record data.

Alternatively, the data processing device of the present invention may be applied to a navigation device which gives guide information about movement of a moving object, and may be constructed in a structure which executes the following processing. That is, a keyword of keyword data 411 may be a keyword indicative of a location point, for example. Further, the structure may be arranged such that, when the moving object comes near a location point indicated by a keyword, a related BML file 412 and related main data 413 of keyword related data 410 in which the keyword data 411 is incorporated may be outputted. In this structure, the navigation device can output program-linked data or content-main-data related to the location point when the moving object comes near the location point indicated by the keyword of the keyword data 411. Accordingly, the navigation device can provide improved conveniences.

Further, in the structure in which the data processing device of the present invention is applied to a navigation device, for example, the following processing may be executed. That is, for example, if a keyword of set keyword data is of a restaurant and if a BML file includes information concerning the address of the restaurant, the information concerning the address is converted into coordinate information on map information which the navigation device has, and is incorporated into keyword-related data 410, by the related-data generator 256. Further, the structure may be arranged such that, when map information including coordinate information of the keyword-related data 410 is displayed by the navigation device, i.e., when map information including a location point such as a restaurant related to the keyword-related data 410 is displayed, a related BML file 412 or related main data 413 of the keyword-related data 410 having the coordinate information is outputted. In addition, this structure may be applied to a TV receiver or personal computer having application software which displays map information. In a structure of this kind, when map information including coordinate information of the keyword-related data 410 is displayed, for example, a navigation device or the like can output program-linked data and content-main-data related to a location point on the map information. Accordingly, the navigation device or the like can provide improved conveniences.

By the related-data generator 256, the memory 240 is let store information concerning the number of settings an arbitrary keyword has been set by a user and/or setting date/time. Further, the structure may be arranged such that, for example, keyword-related data 410 related to a keyword which has been set a large number of times or which is frequently set and inputted is automatically generated, based on the number of settings or the setting date/time. In this structure, keyword-related data 410 can be generated, reflecting user's preferences corresponding to the number of settings and frequency of setting inputs. Therefore, the recording/reproducing device 200 can provide more improved conveniences.

Although each of the functions described above is constructed as a program, each function may be constituted in form of hardware like a circuit board or an element like an IC (Integrated Circuit). Thus, each function can have any form. If the structure is arranged such that the functions are constructed as programs or read optionally from recording media, more prevalence and easier handling can be achieved.

The above embodiment adopts the BML standard as an example of a digital file. However, the present invention is not limited to this but is applicable to the MHP (Multimedia Home Platform) standard, for example.

Furthermore, a specific structure and procedures to practice the present invention can be appropriately modified to a different structure and the like within a scope in which the objects of the present invention can be achieved.

[Operation and Advantages of Embodiment]

As has been described above, in the above embodiment, the processing section 250 of the recording/reproducing device 200 acquires content data of a content set by a user, by means of the data accumulation controller 254. Further from the content data, the processing section 250 acquires program-linked data which links with content-main-data. Also, by the related-main-data acquiring section 255, the processing section 250 acquires set keyword data stored in the memory 240, and recognizes presence of a BML file including a character string related to a keyword set by the user, among program-linked data. Then, the processing section 250 acquires synchronization information of the BML file. Further, based on the synchronization information, the related-main-data acquiring section 255 recognizes date/time when content-main-data with which the BML file links is outputted, and acquires the content-main-data outputted at the date/time recognized.

Therefore, based on program-linked data outputted in synchronization with content-main-data corresponding to a particular scene in a content, the processing section 250 of the recording/reproducing device 200 can acquire only the content-main-data of the particular scene related to the keyword set by the user, from the content-main-data of a content being broadcasted, by means of the related-main-data acquiring section 255. Accordingly, the recording/reproducing device 200 can appropriately acquire the content-main-data.

The priority application Number JP2004-184044 upon which this patent application is based is hereby incorporated by reference.

What is claimed is:

1. A data processing device for selecting a subpart of a program, the device comprising:
    a character data acquiring section which acquires character data;
    a content character data acquiring section which acquires content character data outputted together with the program and indicating contents of the program;
    a partial data output date/time acquiring section which acquires date/time information of an occurrence of the subpart of the program which is related to the content character data relevant to the character data; and
    a data acquiring section which acquires the subpart of die program which corresponds to a date/time of the occurrence of die subpart of the program, based on the partial data output date/time information.

2. The data processing device according to claim 1, wherein
    the partial data output date/time information includes partial data output start date/time information concerning date/time when outputting of the subpart of the program is started, and partial data output end date/time information concerning date/time when outputting of the subpart of the program ends, and
    the data acquiring section acquires the subpart of the program, based on the output start date/time information and the output end date/time information.

3. The data processing device according to claim 1, further comprising:
    a data accumulation controller which acquires the program, makes the acquired program accumulated in a data accumulation section, and makes the content character data and the partial data output date/time information accumulated in the data accumulation section; and
    a data output date/time acquiring section which acquires data output date/time information concerning date/time when the program accumulated in the data accumulation section is outputted, wherein
    the data acquiring section specifics the position of the subpart in the program accumulated in the data accumulation section and acquires the specified position, based on the date/tine of the data output date/time information and the partial data output date/time information.

4. The data processing device according to claim 3. wherein
    the data output date/time information is information concerning date/time when outputting of the program is started, and
    the data acquiring section recognizes an interval from when outputting of the program is started to when the subpart of the program is outputted, based on the date/time of the data output date/time information and the partial data output date/time information, and the data acquiring section specifies the position of the subpart in the program, based on the interval recognized.

5. The data processing device according to claim 1, wherein
    if it is recognized that elapsed time after accumulation of program was started has become equal to or longer than a predetermined time, the data acquiring section then determines whether or not the content character data related to the character data has been accumulated in the data accumulation section, and
    when recognizing that the determination of whether or not the content character data has been accumulated has been made by the related-main-data acquiring section,
    the data accumulation controller deletes all programs accumulated within the predetermined time.

6. The data processing device according to claim 1, thither comprising:
    a data relating section which makes a data storage store the subpart of the program and the character data corresponding to the partial data output date/time information concerning the date/time when the subpart is outputted, with the subpart of the program and the character data related to each other; and
    a notification controller which makes a notification section give information that selection of the character data is requested, and which also makes, when acquiring character data select information which expresses that the character data has been selected, the notification section give information about the subpart of the program related to the character data, based on the character data select information.

7. The data processing device according to claim 1, wherein the character data is comprised of text data further comprising program-linked data of a markup language file.

8. A data processing method for selecting a subpart of a program, comprising:
    providing a calculating section, wherein the calculation section executes the steps of acquiring character data, acquiring content character data indicative of a desired subpart of the program and contents of the program and outputted together with the program, acquiring partial data output date/time information of an occurrence of the subpart of the program which is related to the content character data relevant to the character data, and acquiring the subpart of the program corresponding to the date/time of the occurrence of the subpart of the program, based on the partial data output date/time information.

9. A data processing method according to claim 8, wherein the character data is comprised of text data further comprising program-linked data of a markup language file.

10. A recording medium which records a data processing algorithm in a manner readable by a calculating section, the data processing algorithm making a calculating section function as a data processing device for selecting a subpart of a program, the data processing device comprising:

a character data acquiring section which acquires character data;

a content character data acquiring section which acquires content character data outputted together with the program and indicating contents of the program;

a partial data output date/time acquiring section which acquires date/time information of an occurrence of the subpart of the program which is related to the content character data relevant to the character data; and a data acquiring section which acquires the subpart of the program which corresponds to a date/time of the occurrence of the subpart of the program, based on the partial data output date/time information.

11. A recording medium according to claim 10, wherein the character data is comprised of text data further comprising program-linked data of a markup language file.

12. A recording medium which records a data processing algorithm in a manner readable by a calculating section, the data processing algorithm making a calculating section execute a data processing method, the data processing method selecting a subpart of program data by a calculating section, wherein the calculation section executes the steps of:

acquiring character data, acquiring content character data indicative of a desired subpart of the program and contents of the program and outputted together with the program, acquiring partial data output date/time information of an occurrence of the subpart of the program which is related to the content character data relevant to the character data, and acquiring the subpart of the program corresponding to the date/time of the occurrence of the subpart of the program, based on the partial data output date/time information.

13. A recording medium according to claim 12, wherein the character data is comprised of text data further comprising program-linked data of a markup language file.

* * * * *